United States Patent [19]

Ecclesine

[11] Patent Number: 5,822,618
[45] Date of Patent: Oct. 13, 1998

[54] SYSTEM FOR AUTOMATICALLY SWITCHING TO DMA DATA TRANSFER MODE TO LOAD AND UNLOAD DATA FRAMES WHEN THERE ARE EXCESSIVE DATA FRAMES IN MEMORY BUFFER

[75] Inventor: Peter Ecclesine, Livermore, Calif.

[73] Assignee: Cirrus Logic, Inc., Fremont, Calif.

[21] Appl. No.: 818,044

[22] Filed: Mar. 14, 1997

Related U.S. Application Data

[63] Continuation of Ser. No. 343,073, Nov. 21, 1994, abandoned.

[51] Int. Cl.⁶ ..................................................... G06F 13/00
[52] U.S. Cl. ........................... 395/877; 395/838; 395/842; 395/872
[58] Field of Search .................................... 395/877, 838, 395/842, 872, 250, 825

[56] References Cited

U.S. PATENT DOCUMENTS

| | | | |
|---|---|---|---|
| 4,933,840 | 6/1990 | Sera et al. | 395/877 |
| 5,043,981 | 8/1991 | Firoozmand et al. | 370/85.1 |
| 5,307,459 | 4/1994 | Petersen et al. | 395/200.03 |
| 5,412,782 | 5/1995 | Hausman et al. | 395/250 |
| 5,487,154 | 1/1996 | Gunji | 395/842 |
| 5,488,724 | 1/1996 | Firoozmand | 395/200.07 |
| 5,515,373 | 5/1996 | Lynch et al. | 370/79 |
| 5,524,268 | 6/1996 | Geldman et al. | 395/825 |

*Primary Examiner*—Thomas C. Lee
*Assistant Examiner*—Le Hien Luu
*Attorney, Agent, or Firm*—Frank D. Nguyen; Robert P. Sabath; Lowe, Price, LeBlanc & Becker

[57] ABSTRACT

A network controller, which allows data frames received to be held in an internal memory buffer, has the capability to selectively switch between a DMA mode of data transfer and a non-DMA mode of data transfer to move data frames from the internal memory buffer to a desired location. When the overflow of the memory buffer is anticipated, a DMA controller is automatically engaged to move the data frames to a system memory to prevent the received frames from being discarded. An auto-DMA decision logic engages the DMA controller based on factors such as the number of data frames accumulated in the memory buffer, remaining capacity of the memory buffer, frame loading and unloading rates, and time interval during which data frames have been received without completely unloading the memory buffer.

9 Claims, 3 Drawing Sheets

FUNCTIONAL BLOCK DIAGRAM
OF THE CS8900
NETWORK CONTROLLER

SYSTEM FOR AUTOMATICALLY SWITCHING TO DMA DATA TRANSFER MODE TO LOAD AND UNLOAD DATA FRAMES WHEN THERE ARE EXCESSIVE DATA FRAMES IN MEMORY BUFFER

This application is a Continuation of application Ser. No. 08/343,073, filed on Nov. 21, 1994, now abandoned.

TECHNICAL FIELD

This invention relates generally to data communication systems and, more particularly, to a data network system and method wherein a controller that receives and stores data in its internal memory buffer can automatically invoke a Direct Memory Access (DMA) mode of data transfer to prevent overflowed data from being lost.

BACKGROUND

The task of accommodating increasing bus traffic in data communication networks continues to pose as a challenge. The primary bottle-neck in most data communication networks appears to be the system bus. The system bus is a bottle-neck primarily because many devices share the same bus and must contend for its use in transmitting or receiving data. For this reason, the system bus may be unavailable at crucial times for reasons such as operating priorities, system interrupts, and other bus traffic. Thus, in a computer system, it is necessary to buffer data received to accommodate bus traffic with other data devices.

Examples of devices buffering data received to accommodate bus traffic with other data sources and sinks include data conversion devices. Data conversion devices are basically front end communications processors that act as the interface between the host CPU and external terminals. Data conversions devices provide limited internal storage to continue receiving data from data sources while waiting for converted data to be moved to data sinks via the system bus.

Since the prior art solution is to provide storage capability while the system bus is busy, there exists an inherent problem in the prior art solution. This problem manifests when the period during which the system bus remains busy is long enough so that the amount of data accumulated in the temporary storage exceeds its storing capacity. When that occurs, data may be lost. To prevent data loss, data must be transferred to another location.

Generally, the data transport techniques most commonly used are Programmed I/O and Direct Memory Access (DMA). With Programmed I/O, the Host CPU is involved in every aspect of the data transport process. Even if the network adapter's control and data port parameters are defined and mapped in system memory, the performance of the network/system interface is, in most cases, limited by the CPU's input/output bandwidth and system bus utilization. Moreover, because Programmed I/O utilizes the CPU in every aspect of transferring data, when used as the transport mechanism in preventing data loss due to other bus traffic, this technique or those using the Host CPU as the main driving force in the data transport process is subject to an additional possibility of data loss when CPU interrupt latency rises due to CPU workload.

Direct Memory Access (DMA), on the other hand, is designed to transfer large "blocks or units of data" with little or no Host CPU intervention. Most DMA transport mechanisms are based on the Master-Slave transport model. With this type of transport mechanism, the Host CPU initiates the data move or transfer, and once started, the Host CPU is not involved again until the entire "block or unit of data" has been transferred. For this reason, DMA is much more efficient in term of CPU time required and is a preferred method to transfer large blocks of data than Programmed I/O or other CPU-intensive data transfer methods on the whole. On the other hand, DMA data transfer is slower than Programmed I/O and other CPU-intensive data transfer methods due to the extra moving steps involved in DMA transfer. Moreover, DMA techniques, such as DMA masters and DMA slaves, have their limitation in that additional processing is normally required to move data from where the DMA process puts it to the data sink (e.g., a specified application memory location). This is because the DMA controller is not able to determine the type and size of data, and the CPU must examine the data to determine the proper data sink.

For the above reasons, in devising a data transport technique to use in moving data from the temporary storage buffer to another location, a dual approach, which utilizes non-DMA data transfer (e.g., Programmed I/O) to move data to the proper sink in most instances but switches to DMA transfer if the internal storage limit is approached, is most desirable. Current commercially available data conversion devices that are DMA masters (e.g., Cirrus Logic CD-2400 Serial Interface Controller) or DMA slaves (e.g., Advanced Micro Devices Am7990 Lance Ethernet Controller) do not allow the CPU to move data from internal storage. On the other hand, commercially available data conversion devices with internal storage that rely on the CPU to move data (e.g., National Semiconductor 16550 AFN Serial Interface Controller) have the aforementioned additional possibility of data loss when CPU latency rises due to its workload.

Thus, it is desirable to provide the capability for automatic switching between a non-DMA data transfer mode and a DMA transfer mode to move data from the buffer storage to another location before the buffer storage is full.

Furthermore, it is desirable to provide an internal storage manager to monitor the fill and drain streams of data frames together with the current buffer capacity for storage to decide whether data loss is anticipated before switching to a DMA data transfer mode.

DISCLOSURE OF THE INVENTION

Accordingly, one advantage of the invention is in providing a network controller that has the ability to accumulate data received in its internal buffer storage and to selectively engage between a non-DMA data transfer mode and a DMA transfer mode to transfer data from the internal buffer storage to another location before it is full.

Another advantage of the invention is in providing an internal storage manager that monitors the fill and drain streams of data frames together with the current buffer storage capacity of a network controller to determine whether data loss is anticipated before switching to a DMA data transfer mode.

The above and other advantages of the invention are achieved, at least, in part, by providing a system for receiving from a plurality of terminals data frames to be processed by a host processor that comprises a controller responsive to the data frames for providing an interface between the terminals and the host processor and having a memory buffer for holding the data frames received from the terminals for processing by the host processor. Also, a system memory having a capacity larger than the memory buffer is available for storing the data frames received from the plurality of terminals. While a non-DMA data transfer mode is normally used to transfer data from the memory buffer to any desired location, a DMA means responsive to the host processor is used for writing the data frames received from the terminals into the system memory. The controller includes a buffer manager for monitoring the data frames supplied to the memory buffer and switching means responsive to the buffer manager for automatically engaging the DMA means. While the controller is preferably provided on a chip external with respect to the system memory, the DMA means may be provided either on the chip or externally.

In accordance with one feature of the invention, the DMA means is engaged to transfer data frames received from the terminals to the system memory when the number of data frames received from the terminals exceeds a predetermined number.

In accordance with another feature of the invention, the DMA means is engaged to transfer data frames received from the terminals to the system memory when the time period during which the frames have been received from the terminals exceeds a predetermined period.

In accordance with a further feature of the invention, the DMA means is engaged to transfer data frames received from the terminals to the system memory when the capacity of the memory buffer occupied by the data frames exceeds a predetermined value.

Preferably, the buffer manager makes a decision whether to engage the DMA means based on the rate of loading data frames into the memory buffer and the rate of unloading data frames from the memory buffer. The switching means disengages the DMA means in response to an instruction from the host processor.

In accordance with a further aspect of the invention, the buffer manager arbitrates the priority between requests for access to load data frames into the memory buffer and requests for access to unload data frames from the memory buffer. Preferably, the loading requests have higher priority than the unloading requests.

In accordance with another aspect of the invention, in a network controller for receiving data frames having an internal memory buffer for holding the data frames received from a network for processing by a host processor, a DMA means for transferring the received data frames into a system memory, a buffer manager, and a decision logic means. The buffer manager comprises a held frame monitor which is responsive to the memory buffer and is used in monitoring data frames that are loaded into as well as unloaded from the memory buffer. The decision logic means is responsive to the buffer manager and is used to automatically engage the DMA means in unloading data frames from memory buffer when its overflow is anticipated.

In a preferred embodiment of the invention, the buffer manager further comprises a loading means responsive to the data frames received for generating word storage addresses to write the data frames into the memory buffer. The buffer manager further comprises an unloading means responsive to the memory buffer for generating addresses for DMA unloading of data frames. In response to the host processor, a host address means generates addresses that are used by the host processor to read the data frames from the memory buffer. A memory arbitration means which is responsive to signals associated with the data frames received, the unloading means, and the host processor to determine whether to write the data frames into the memory buffer or to read the data frames from the memory buffer. A memory address multiplexer selectively provides the memory buffer with the addresses generated by the loading means, unloading means, and host address means in response to a control signal from the memory arbitration means.

In accordance with one preferred embodiment, the held frame monitor comprises a held frame counter. The count value in the held frame counter reflects the number of frames loaded into the memory buffer minus the number of frames unloaded from the memory buffer. The decision logic means compares the count value supplied by the held frame counter with a variable threshold value to engage the DMA means in unloading the memory buffer when the count value exceeds the threshold value. As an example, the threshold value may be based on the rate of unloading said data frames from the memory buffer.

In accordance with another preferred embodiment of the invention, the held frame monitor comprises a timer means to measure the time interval during which the data frames are loaded into the memory buffer. When the time interval supplied by the timer exceeds a predetermined value, the decision logic means engages the DMA means in unloading the data frames from the memory buffer. The predetermined value may be based on the rate of unloading data frames from the memory buffer. The timer means is reset when all frames are unloaded from the memory buffer.

In accordance with one feature of the invention, the DMA means unloads a part of a data frame which is still being loaded into the memory buffer.

In accordance with another feature, the DMA means unloads a data frame only after the frame is completely loaded into the memory buffer. In this case, the status and length fields are added to the beginning of the frame.

The DMA means may comprise a DMA access logic that is a part of the network controller and a DMA controller that is external to the network controller. The internal memory buffer may also be provided on the controller chip. The system memory may be provided externally with respect to the chip.

In accordance with a method of the present invention, the following steps are carried out:

loading the received data frames into a buffer of the network controller, supplying the host processor with the frames unloaded from the buffer, monitoring the frames loaded into the buffer and unloaded from the buffer, and automatically switching into a DMA transfer mode to use a DMA controller for moving data into a system memory, when overflow of the buffer is anticipated.

Overflow of the buffer may be anticipated based on the number of data frames accumulated in the buffer and based on the rates of loading the frames into the buffer and unloading the frames from the buffer. Overflow of the buffer may also be based on the remaining capacity of the buffer to hold new frames coupled with the rate of unloading the frames from the buffer. Finally, overflow anticipation may be based on a time period during which data frames are loaded into the memory buffer and the rate of unloading the frames from the memory buffer.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 1:
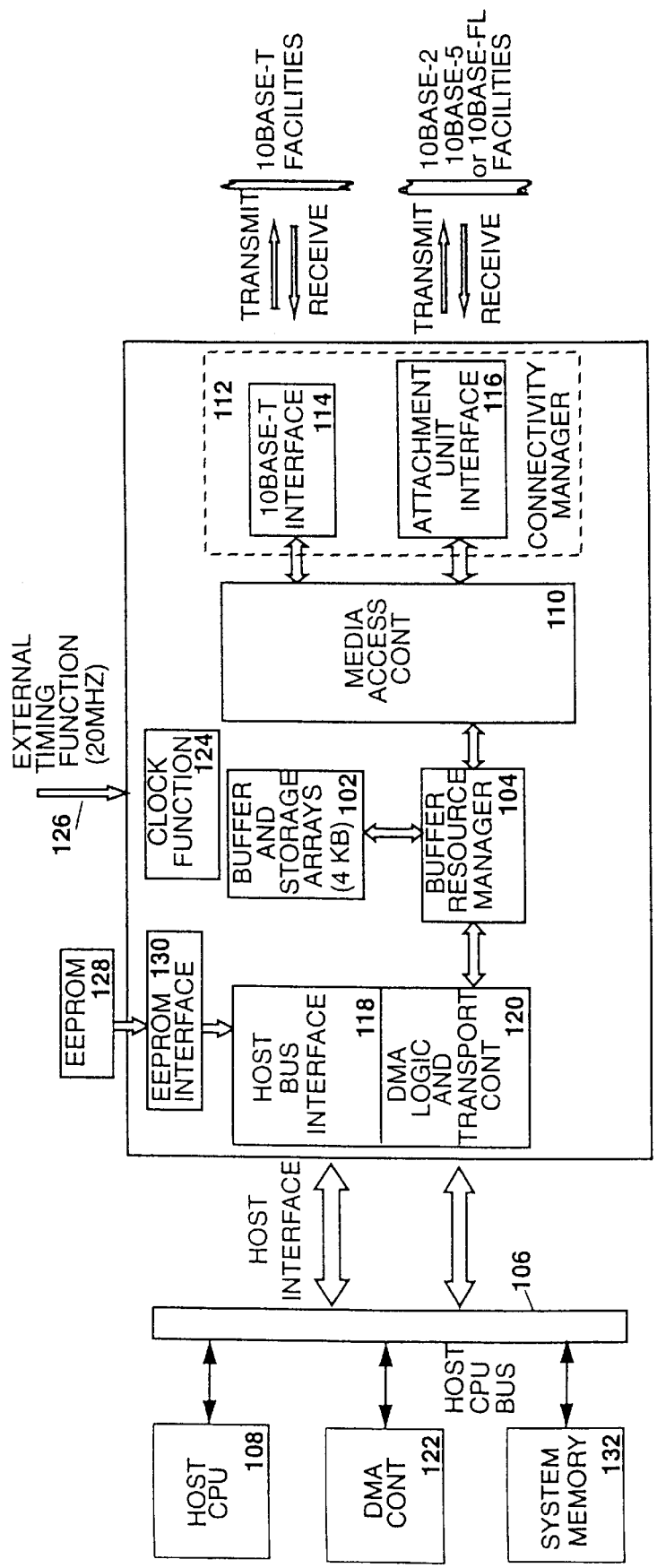
FIG. 1 shows a block-diagram of the CS8900 network controller that implements the current invention in its architecture.

Although the invention has general applicability in the field of data transfer using a DMA controller, the best mode for practicing the invention is based in part on the realization that the current invention is implemented as part of the Crystal Semiconductor CS8900 network controller shown in FIG. 1. The CS8900 is manufactured and marketed by Crystal Semiconductor, Inc. of Austin, Tex. As a network controller, the CS8900 is a front end communications interface between the host CPU and terminals in the Ethernet environment. It is to be understood that the invention is applicable to any type of data conversion device, to any kind of data, and to any type of system-based memory facility.

FIG. 1 is an overall block diagram of the CS8900 which implements the present invention in its design. The CS8900 network controller provides management and storage mechanism for multiple data blocks or frames of varying length and type received from a network. In particular, it comprises a buffer and storage arrays 102 capable of storing about 4 kilobytes of data. A buffer resource manager 104 manages and controls access to buffer 102. Media access controller 110 is coupled to the buffer resource manager 104 to manage data transmitted to and received from the network. It performs all of the Ethernet functions required by sections 3 and 4 of the ISO/IEC 8802-3 standard such as collision detection, back-off/retry, preamble generation and detection, and cyclic redundancy code (CRC) generation and testing. Connectivity manager 112 is coupled to media access controller 110 to support twisted pair (10BASE-T) interface 114 and attachment unit interface 116. These interfaces transmit and receive data via 10BASE type networks that are in compliance with ISO/IEC 8802-3. Filters may be provided to connect unshielded and shielded cables directly to the network controller.

Host bus interface 118 provides an interface with host CPU 108 via system/host CPU bus 106. Data transfer is normally supported by host CPU 108 via host bus interface 118. DMA logic and transport controller 120 supports DMA data transfer to system memory 132 through DMA lines. DMA controller 122, on the other hand, provides the necessary interface with host CPU 106 for all DMA data transfer operations. DMA controller 122 may be a part of the network controller chip or may alternatively be external with respect to the chip.

Clocking function on the chip is provided by either crystal oscillator 124 or by 20 MHz TTL external input 126. EEPROM 128 is a non-volatile memory that stores configuration and set-up parameters of the network controller. EEPROM 128 is coupled to the network controller through EEPROM interface 130. More particularly, EEPROM interface 130 provides the connection between EEPROM 128 and host bus interface 118.

The network controller has the capability to select the most effective method of moving data frames received across system/host CPU bus 106 to system memory 132 or any other specified locations that share a bus with the host CPU. In selecting the most effective data transport mode, the network controller first alerts host CPU 108 that the number of data frames accumulated in buffer 102 is approaching its capacity. Next, the network controller signals the host CPU to start transfer data from buffer 102. In the event the host CPU is slow in unloading data frames from buffer 102 (e.g., the host CPU may be occupied with higher priority tasks), the network controller automatically switches to the DMA slave mode to move the accumulated data frames via DMA controller 122 to system memory 132. Because data frames may be lost if the host CPU does not perform the requested data transfer in a timely manner, the auto-receive DMA mode is used to prevent data loss. In the auto-receive DMA mode, the network controller chip monitors its buffer capacity and data stream. This monitoring process enables the network controller to switch to the DMA slave mode when data loss is anticipated.

As an additional feature, the network controller's transport mechanism incorporates a memory address scheme that allows the network/system interface to appear as part of the system memory. As a result, data can be transferred to buffer 102 in a single contiguous transfer.

Figure 2:
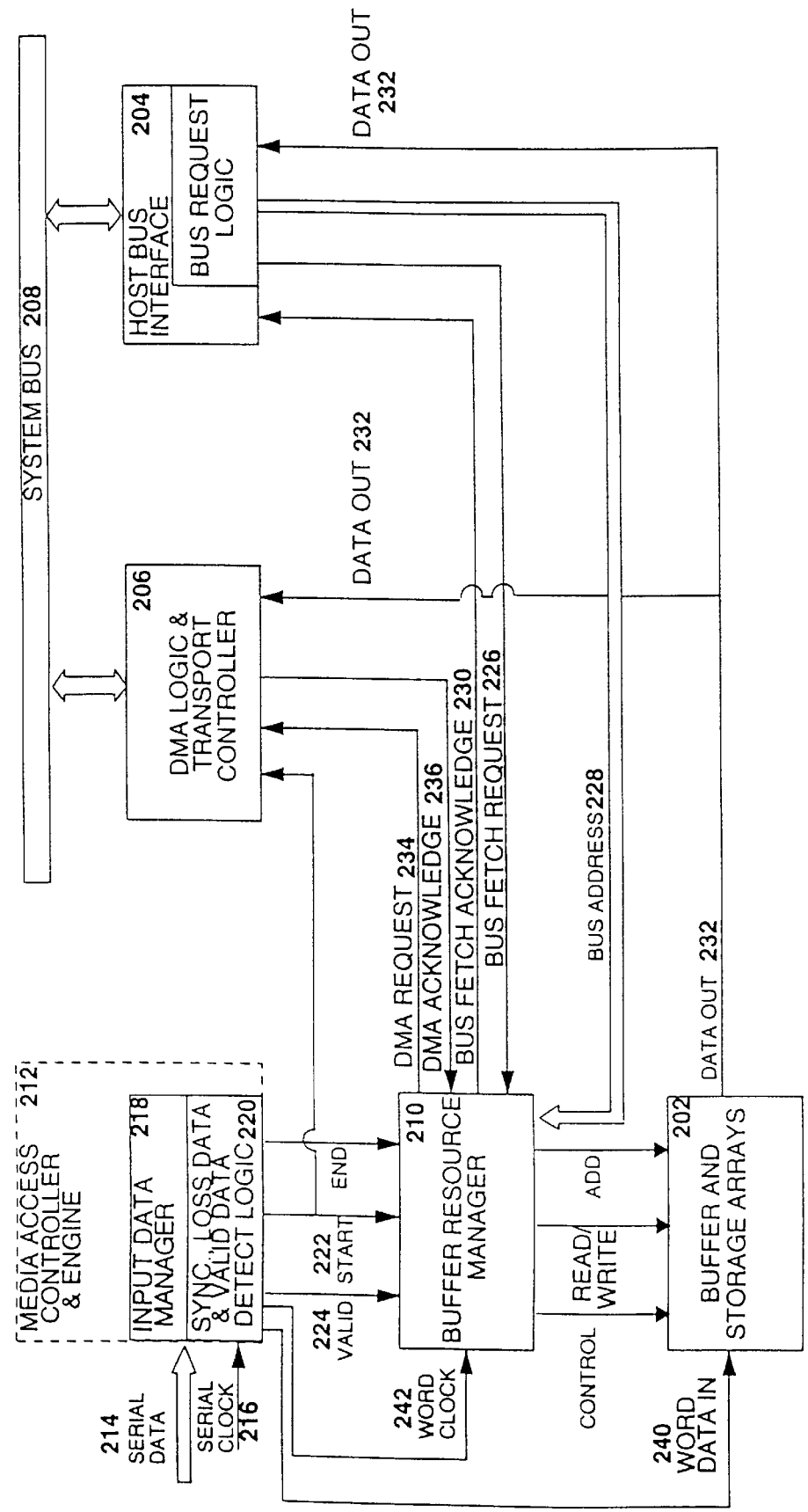
FIG. 2 illustrates an auto-receive DMA mechanism in accordance with the present invention.

FIG. 2 is block diagram illustrating how the auto-receive DMA data transfer mode is implemented in the present invention. Under the auto-receive DMA scheme, data frames stored in the network controller's buffer and storage arrays 202 can be transferred by host CPU 108 or transferred from the buffer in a DMA slave mode across system bus 208 (shown in FIG. 1 as system bus 106) to a specific location in system memory 132. In non-DMA transfer, host CPU 108 accesses buffer and storage arrays 202 via host bus interface 204. In DMA transfer, DMA logic & transport controller 206 is used to transfer data frames stored in buffer and storage arrays 202 (hereinafter memory buffer 202) to system memory 132.

The host CPU and system memory share system bus 208 which is also coupled to host bus interface 204 and DMA logic & transport controller 206. As discussed earlier, host bus interface 204 provides the interface between host CPU 108 and the network controller. Likewise, DMA logic & transport controller 206 provides the interface between DMA controller 122 and the network controller.

Buffer resource manager 210 controls the data read and write operations of buffer 202. Buffer resource manager 210 also arbitrates between requests for read access to buffer 202 by host interface 204 and by DMA controller 206 as well as write access to store data frames received in memory buffer 202.

Serial data stream 214 and serial clock signal 216 are provided as inputs to media access controller & engine 212. Media access controller & engine 212 comprises input data manager 218 and synchronous, loss data, & valid data detector logic 220. Media access controller & engine 212 formats data from serial data stream 214 into a formatted data frame which is checked by synchronous, loss data, & valid data detector logic 220 to determine whether the frame's delimiter field, destination address field, and an active carrier are present. If the delimiter field, destination address field, and active carrier are all present, a valid signal is provided to buffer resource manager 210 to signal to buffer resource manager 210 that the serial data stream being received is valid. Examples of invalid data include losing a carrier or having an improper address. Media access controller & engine 212 further provides buffer resource manager 210 with a start of frame signal to indicate the beginning of valid data flow. The start of frame signal is also provided to DMA logic & transport controller 206 to be used in assembling data on a data content basis. Eventually, media access controller & engine 212 provides buffer resource manager 210 with an end of frame signal to indicate end of the data flow. Moreover, media access controller & engine 212 synchronizes, reframes, and provides serial-to-parallel conversion to the data received.

To write data into memory buffer 202, buffer resource manager 210 provides memory buffer 202 with control and address information to go with word data 240 and word clock 242 from media access controller & engine 212. To read data from memory buffer 202 in the non-DMA data transfer mode, host bus interface 204 provides buffer resource manager 210 with bus fetch request 226. Host bus interface 204 also sends bus address signal 228 to specify the address of the data to be read out. In response, buffer address manager 210 sends host bus interface bus 204 fetch acknowledge signal 230. Based on the memory address decoded from bus address signal 228, data is retrieved from the appropriate memory locations in buffer 202 and sent to host bus interface 204 via data out line 232.

On the other hand, to engage DMA logic & transport controller 206 in reading data frames stored in memory buffer 202, buffer resource manager 210 sends DMA request signal 234 to DMA logic & transport controller 206. In response, DMA controller 206 sends DMA acknowledge signal 234 to buffer resource manager to start the process. Memory buffer 202 uses the same data out port 232 to transfer data from buffer 202 in both non-DMA transfer mode and DMA transfer mode.

A summary of the auto-receive DMA mode implemented in the present invention is presented next. In this mode, data frames received are first stored in memory buffer 202 and are normally transferred by host CPU 108 via host interface 204 to a desired location. When data loss is anticipated such as when there is not enough room in memory buffer 202 to hold at least one more whole frame, buffer resource manager 210 terminates the non-DMA data transfer mode and engages DMA logic & transport controller 206 to DMA transfer data frames from buffer 202 to system memory 132.

Figure 3:
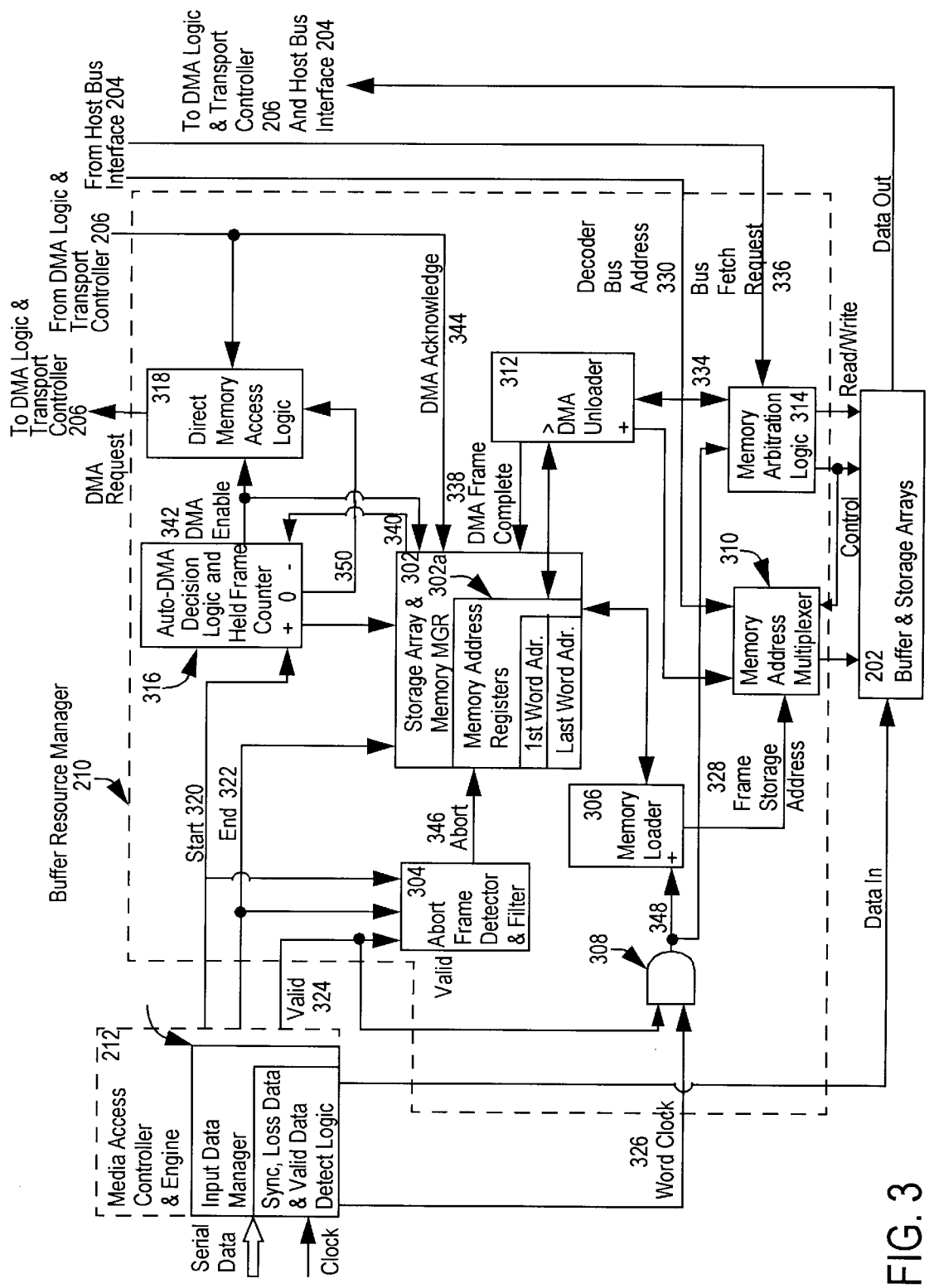
FIG. 3 illustrates in details the buffer resource manager of FIG. 2.

Refference is now made to FIG. 3 which illustrates the working details of buffer resource manager 210. Media access controller & engine 212 provides start of frame signal 320 and end of frame signal 322 to indicate the beginning and end, respectively, of valid frames of data received by the network controller. To keep track of the data frames stored in memory buffer 202, storage array & memory manager 302 stores the addresses of the first and last word of each data frame in memory address registers 302a.

Media access controller & engine 212 further provides the start of frame and end of frame signals 320 & 322 together with valid signal 324 to the abort frame detector & filter 304. Upon detecting that a data frame received is not valid, abort frame detector & filter 304 sends abort signal 346 to storage array & memory manager 302 to terminate the transfer of data into memory buffer 202.

Memory loader 306 serves dual purposes. First, memory loader 306 generates word storage addresses to be used in writing data frames received into memory buffer 202. Loader 306 also serves as a counter to keep track of the number of data words written into memory buffer 202. The count in memory loader 306 is incremented each time a data word is written into memory buffer 202. In order to determine when a data word is written into memory buffer 202, output signal 348 of AND gate 308 is provided as a signal to memory loader 306. The two inputs of AND gate 308 are valid signal 324 and word (parallel) clock signal 326. Because a data word is sent at the occurrence of clock pulse 326, clock pulse 326 is used to alert loader 306 as to when a data word is written into memory buffer 202. Valid signal 324 is provided so that the count is only incremented when the incoming data are valid. Memory loader 306 compares its count with a predetermined value corresponding to the memory buffer capacity. When the buffer capacity limit is reached, the count of memory loader 306 is reset and storage address corresponding to the beginning of memory buffer 202 is provided.

DMA unloader 312 also serves dual purposes. DMA unloader 312 generates DMA address signal 332 to be used in reading stored data frames from memory buffer 202. In addition, DMA unloader 312 serves as a counter to track the number of data frames being read from memory buffer 202. By comparing the DMA addresses it generated with the addresses of the first and last words of each data frame provided by storage array & memory manager 302, DMA unloader can determine when a DMA transfer of a data frame is completed. When this occurs, DMA unloader 312 provides buffer resource manager 302 with DMA frame complete signal 338.

By examining information received from both memory loader 306 and DMA unloader 312 such as comparing frame storage addresses with DMA addresses generated, storage array & memory manager 302 can both load data frames into memory buffer 202 and unload data frames from memory buffer 202 simultaneously.

Memory loader 306 provides frame storage address 328 to memory address multiplexer 310. Memory address multiplexer 310 also receives bus address signal 330 from host bus interface 204 and DMA address 332 from DMA unloader 312. Multiplexer 310 selects one of three addresses provided as its inputs based on a control signal generated by memory arbitration logic 314.

Memory arbitration logic 314 determines which of the following operations is to be performed: 1) data write to memory buffer 202, 2) CPU data read from memory buffer 202, or 3) DMA data read from memory buffer 202. Inputs to memory arbitration logic 314 consist of output signal 348 of AND gate 308, control signal 334 from DMA unloader 312, and bus fetch request signal 336 from host interface 204. When memory arbitration 314 receives bus fetch request 336, it performs a CPU data read operation by signaling memory buffer 202 and sending a control signal to memory address multiplexer 310 to instruct it to send bus address signal 330 to memory buffer 202 to read data from its memory. When memory arbitration logic 314 receives DMA unloader control signal 334, it performs a DMA data read operation by signaling memory buffer 202 and by sending a control signal to memory address multiplexer to instruct it to send DMA address signal 332 to memory buffer 202. On the other hand, output signal 348 of AND gate 308 commands memory arbitration logic 314 to perform a data write operation by sending a write signal to memory buffer 202. Additionally, memory arbitration logic 314 sends a control signal to memory address multiplexer 310 to instruct it to send frame storage address signal 328 to memory buffer 202. In the event of conflict, a data write operation has higher priority.

The function of auto-DMA decision logic and held frame counter 316 is to monitor the current number of data frames stored in memory buffer 202 and to automatically switch to the DMA data transfer mode when a the current data frame count exceeds a threshold value. Because the number of data frames accumulated in memory buffer 202 depends on a number of factors such as the number of data frames received from the network and the number of data frames unloaded, these factors are taken into consideration in keeping track of the current number of data frames stored in memory buffer 202. In the current preferred embodiment, start of frame signal 320 and control signal 340 are provided as inputs to auto-DMA decision logic and held frame counter 316. When auto-DMA decision logic and held frame counter 316 receives start of frame signal 320 indicating that the network controller has begun to receive a valid data frame, auto-DMA decision logic and held frame counter 316 increases its data frame count value.

Conversely, the count value is decreased when control signal 340, which indicates that a data frame has been unloaded from memory buffer 202, is received. When the count value is zero, auto-DMA decision logic and held frame counter 316 sends zero-count signal 350 to direct memory access logic 318 which in turn informs DMA controller 206 that memory buffer 202 is empty.

Because a count increment is made at the start of a valid data frame, either an entire data frame or a part of a data frame counts as an increment. Since auto-DMA decision logic and held frame counter 316 takes into account a data frame that is currently being loaded, memory buffer 202 may be completely emptied. However, in the present invention, DMA transfer mode can be used to unload a data frame that is still being loaded into memory buffer 202.

Alternatively, DMA transfer mode may be engaged only after a data frame has been completely loaded into memory buffer 202. In this case, the status and length fields are added to the front of the data frame to speed up the transfer process. These information become available when a complete data frame has been received.

To determine whether a threshold value is reached or approached, auto-DMA decision logic and held frame counter 316 utilizes a threshold register to store a predetermined value which is compared with the current number of data frames stored in memory buffer 202. When the current value exceeds the threshold value, auto-DMA decision logic and held frame counter 316 generates a DMA enable signal 342. DMA enable signal 342 is sent to direct memory access logic 318 which in turn sends a DMA request to the DMA controller 206 to initiate the DMA data transfer process. DMA enable signal 342 is also provided to buffer resource manager 302 together with DMA acknowledge signal supplied by DMA controller 206 in response to the DMA request. As long as DMA enable signal 342 remains active, direct memory access logic 318 continues to generate DMA request signal for DMA data transfer.

The threshold value can also be based on the capacity of memory buffer 202 (i.e., the number of data words that has been loaded into the buffer). The threshold value can also be based on the remaining capacity of the memory buffer (i.e., the number of words that can be still loaded into the buffer after the new frame is received). The remaining capacity can be based on the difference between the frame loading and unloading rates.

Alternatively, auto-DMA decision logic and held frame counter 316 can utilize a timer to keep track of the time period during which data frames are loaded into memory buffer 202. As such, when this period exceeds a predetermined time period, auto-DMA decision logic and held frame counter 316 generates DMA enable signal 342 to direct memory access logic 318 to instruct it to initiate DMA data transfer. In selecting the predetermined time period, the frame loading rate, the frame unloading rate, and the memory buffer capacity are taken into consideration.

The network controller can be switched back to the CPU-intensive data transfer mode in response to an instruction supplied by the host CPU.

The above description provides a disclosure of a network controller having an auto-receive DMA mode of operation that allows data frames received to be stored in an internal memory buffer and subsequently to be transferred to another location. Normally, the network controller utilizes a CPU-intensive data transfer mode to transfer data from the internal buffer to a desired location to prevent loss of data frames received. However, when an overflow of the memory buffer is anticipated based on factors such as the current number of frames stored in the memory buffer, remaining capacity of the memory buffer, frame loading and unloading rates to and from the memory buffer, and time period during which data frames have been received without unloading the memory buffer, the network controller's auto-DMA decision logic automatically switches to the DMA data transfer mode to avoid the loss of data frames.

This disclosure describes only the preferred embodiments of the invention. However, it is to be understood that the invention is capable of changes and modifications within the scope of the inventive concept as expressed herein.

I claim:

1. A system for loading and unloading data frames each including a predetermined plurality of words, comprising:
    an interface controller for handling data frames from a data frame source;
    a memory buffer for storing data frames handled by said interface controller;
    a system memory having a capacity larger than said memory buffer for storing data frames from said memory buffer; and
    a DMA controller responsive to said interface controller, for transferring data frames from said memory buffer to said system memory;
    wherein said interface controller further comprises:
        a frame start and frame end detector (FS/FED) for detecting the beginning and end of each data frame handled by said interface controller for storage in said memory buffer;
        a buffer manager for monitoring the quantity of data frames supplied to said memory buffer and receiving the addresses of first and last words of data frames stored in said memory buffer at respective first and second detection times when said FS/FED respectively detects the first and last words of a frame; and
        a switch responsive to said buffer manager for automatically engaging said DMA controller when said buffer manager monitors excessive data frames stored in said memory buffer.

2. The system of claim 1, wherein said buffer manager determines whether to engage said DMA by examining the rate at which data frames are supplied to said memory buffer.

3. The system of claim 1, wherein said buffer manager determines whether to engage said DMA by examining the data rate of said memory buffer unloading data frames.

4. The system of claim 1, wherein said buffer manager arbitrates between requests for memory buffer access to load data frames and requests for access to said memory buffer to unload data frames.

5. The system of claim 4, wherein loading requests have higher priority than unloading requests.

6. In a network controller having a non-DMA data transfer mode for transferring data frames stored in a memory buffer of the network controller for transfer to a system memory, and a DMA data transfer mode for transferring received frames into said system memory, a method comprising:

detecting the beginning and end of a plurality of received data frames;

loading received data frames into a selected memory buffer;

storing the addresses of first and last words of data frames loaded into said selected memory buffer;

supplying a system memory with data frames from the selected memory buffer;

noting the completion of the supply of each data frame to system memory;

monitoring the net quantity of data frames loaded into the memory buffer; and automatically switching into a DMA transfer mode when buffer overflow is likely.

7. The method of claim 6, wherein buffer overflow is likely based on data frames accumulated in the memory buffer and rates of loading the data frames into the buffer and unloading the data frames from the memory buffer.

8. The method of claim 6, wherein memory buffer overflow is likely based on remaining buffer capacity to hold additional data frames and the rate of unloading data frames from the memory buffer.

9. The method of claim 6, wherein memory buffer overflow is deemed likely based on the time interval during which data frames are loaded into the memory buffer and the rate of memory buffer frame unloading.

* * * * *